UNITED STATES PATENT OFFICE.

MARK W. MARSDEN, OF LOGAN STATION, PENNSYLVANIA.

METHOD OF TREATING VEGETABLE SUBSTANCES FOR THE RECOVERY OF THEIR VALUES.

1,251,261.  Specification of Letters Patent.  Patented Dec. 25, 1917.

No Drawing.  Application filed April 26, 1916. Serial No. 93,774.

*To all whom it may concern:*

Be it known that I, MARK W. MARSDEN, a citizen of the United States, residing at Logan Station, in the county of Philadelphia and State of Pennsylvania, have invented certain new and useful Improvements in Methods of Treating Vegetable Substances for the Recovery of Their Values, of which the following is a specification.

In the treatment of raw stock of vegetable origin, such as straw, flax, the stalks, roots and stems of the cotton plant, and other products, including wood, for the recovery of the fiber and other values, too much dependence is placed upon the digester or chemical treatment, large quantities of alkali and other reducing chemicals being employed, which make the process expensive both as regards the cost of treatment as well as the proportionate yield in fiber and by-products; the fiber being non-uniform, weak and brittle, and many of the by-products being commercially lost.

Objects of the present invention are to obviate the loss and expense above alluded to and to provide for the disintegration of the materials mentioned in such way that comparatively long and pliant fibers may be recovered, and in such way that the extractive is not deleteriously affected during the operation of dissolving and removing it, so that by economical treatment it will yield all of its contained by-products.

In Letters Patent No. 1,165,089, granted to me Dec. 28, 1915, I have described and claimed a method of treating vegetable substances without the aid of chemicals. The present invention differs therefrom in several steps of treatment and largely in that the starch and invertible carbohydrates are removed prior to the closed or digester treatment, which greatly simplifies the process and results in a larger yield and better quality of by-products and in a better grade of paper pulp.

I have successfully practised the invention as follows:

The raw material is washed to remove all adhering soil and other objectionable matter and is then allowed to stand in a bath of water until saturated or appreciably softened by the action of the water. In other words, it should be in such condition that after passing through crushing or squeezing rolls, the fibers will be loosened from each other in a direction lengthwise without breaking. In this state, that is to say, with the fibers loosely hung together in parallelism, the material is run through a shredder so as to draw the fibers out lengthwise. Thereupon the material is subjected to further crushing or squeezing so as to get a uniformly reduced mass.

It is now ready for the removal of the solid constituents, including starchy matter and invertible carbohydrates, which I shall refer to as the extractive. This is accomplished by steaming the material in an open tank until it is saturated or until the soluble matters are softened, water being gradually added to facilitate the solvent process. The temperature during this treatment preferably ranges from 130 to 165 degrees F. and is maintained by the steam. The liquor is continually run off and tested until it finally shows no evidence of extractive, and the extractive removed is treated for the recovery of the sugars, residual gums, coloring matter, and other valuable components, and this recovery may be accomplished by inversion, fermentation, distillation, or in any appropriate way. The stock deprived of its extractive is then run through a bath of water to remove all traces of the extractive.

I next treat the stock in a closed vessel with water and steam pressure of from 75 to 125 pounds; this treatment and pressure being continued for from three to six hours, more or less, or until the fibers respond freely in a finely-divided state so that the ordinary beater will reduce the pulp to the uniformity required for paper making. The usual steps, including bleaching, if desired, may then be resorted to for the manufacture of paper.

I would here remark that this process applies to all vegetable fibers except woods containing a resin or wax. In such cases an alkali or sulfid will be used during the digester treatment, but under my method of pre-softening, mechanically reducing the stock, and removing the extractive prior to the digester treatment, only a small quantity of chemical is required as compared with the old practice.

Having described the nature and objects of the invention, I claim:—

The method of treating stock of the nature indicated for the recovery of its fiber and other values, which consists in cleansing and softening it by immersion, then subjecting it to squeezing in order to loosen the fibers in the direction of their length, withdrawing the fibers lengthwise and crushing them, steam washing and leaching the crushed mass, while open to the atmosphere, to remove the extractive, and, after rinsing to remove all traces of the extractive, digesting until the fibers are reduced to the uniformity required for paper making.

In testimony whereof I affix my signature in the presence of two witnesses.

MARK W. MARSDEN.

Witnesses:
  E. W. STRAIN,
  ALLAN I. HUCKINS.